(12) United States Patent
Shin et al.

(10) Patent No.: US 12,446,864 B2
(45) Date of Patent: Oct. 21, 2025

(54) ULTRASOUND DIAGNOSTIC APPARATUS AND METHOD FOR CONTROLLING THE SAME

(71) Applicant: SAMSUNG MEDISON CO., LTD., Gangwon-do (KR)

(72) Inventors: Yujin Shin, Seoul (KR); Soyeon Gong, Hanam-si (KR)

(73) Assignee: SAMSUNG MEDISON CO., LTD., Gangwon-Do (KR)

( * ) Notice: Subject to any disclaimer, the term of this patent is extended or adjusted under 35 U.S.C. 154(b) by 136 days.

(21) Appl. No.: 18/235,621

(22) Filed: Aug. 18, 2023

(65) Prior Publication Data

US 2024/0206857 A1    Jun. 27, 2024

(30) Foreign Application Priority Data

Dec. 26, 2022    (KR) .................. 10-2022-0185040

(51) Int. Cl.
| | | |
|---|---|---|
| *A61B 8/00* | (2006.01) | |
| *G06T 7/90* | (2017.01) | |
| *G16H 30/20* | (2018.01) | |

(52) U.S. Cl.
CPC .............. *A61B 8/54* (2013.01); *A61B 8/463* (2013.01); *A61B 8/488* (2013.01); *G06T 7/90* (2017.01);
(Continued)

(58) Field of Classification Search
CPC .. A61B 8/488; G06T 7/90; G06T 2207/10132
See application file for complete search history.

(56) References Cited

U.S. PATENT DOCUMENTS

| | | |
|---|---|---|
| 10,140,710 B2 | 11/2018 | Kreeger |
| 2010/0069757 A1 | 3/2010 | Yoshikawa et al. |
| | (Continued) | |

FOREIGN PATENT DOCUMENTS

| | | |
|---|---|---|
| JP | H07-23958 A | 1/1995 |
| JP | 2012-161537 A | 8/2012 |
| KR | 10-2015-0114285 A | 10/2015 |

OTHER PUBLICATIONS

"Freeze-frame." Merriam-Webster.com Dictionary, Merriam-Webster, https://www.merriam-webster.com/dictionary/freeze-frame. Accessed Mar. 26, 2025. (Year: 2025).*
(Continued)

*Primary Examiner* — Joel Lamprecht
(74) *Attorney, Agent, or Firm* — Morgan Lewis & Bockius LLP

(57) ABSTRACT

Provided is an ultrasound diagnostic apparatus including a probe configured to transmit an ultrasound signal to an object and receive an ultrasound echo signal reflected from the object, a display module, an input device, a storage, and a controller configured to obtain a plurality of color doppler image frames based on processing of the echo signal, store the plurality of color doppler image frames in the storage, and control the display module to sequentially display the plurality of color doppler image frames, wherein the controller is configured to determine a recommended color doppler image frame based on color mapping information of the plurality of color doppler image frames in response to receiving an image freeze command through the input device, and control the display module to display the recommended color doppler image frame as a freeze image.

8 Claims, 12 Drawing Sheets

(52) U.S. Cl.
CPC ......... *G16H 30/20* (2018.01); *G06T 2200/24* (2013.01); *G06T 2207/10024* (2013.01); *G06T 2207/10132* (2013.01); *G06T 2207/20081* (2013.01)

(56) References Cited

U.S. PATENT DOCUMENTS

| | | |
|---|---|---|
| 2012/0283569 A1 | 11/2012 | Ciompi et al. |
| 2014/0088423 A1 | 3/2014 | Noguchi et al. |
| 2015/0250446 A1 | 9/2015 | Kanayama |
| 2015/0272543 A1 | 10/2015 | Kim et al. |
| 2015/0342565 A1 | 12/2015 | Imamura |
| 2020/0187895 A1 | 6/2020 | Gong et al. |
| 2021/0015456 A1* | 1/2021 | Chiang ................ A61B 8/0883 |
| 2021/0275150 A1* | 9/2021 | Ban ......................... A61B 8/54 |

OTHER PUBLICATIONS

Bian P, Zhang X, Liu R, Li H, Zhang Q, Dai B. Deep-Learning-Based Color Doppler Ultrasound Image Feature in the Diagnosis of Elderly Patients with Chronic Heart Failure Complicated with Sarcopenia. J Healthc Eng. Jul. 2, 20219;2021:2603842. doi: 10.1155/2021/2603842. PMID: 34367535; PMCID: PMC8346313. (Year: 2021).*

Extended European Search Report issued Jan. 29, 2024 for European Patent Application No. 23190553.0.

Communication under Rule 71(3) EPC issued in corresponding European Application No. 23 190 553.0 dated Jun. 6, 2025.

* cited by examiner (a)

(b)

(a)

(b)

(a)            (b)

(a)                        (b)

(a)

(b)

(a)

(b)

(c)

(d)

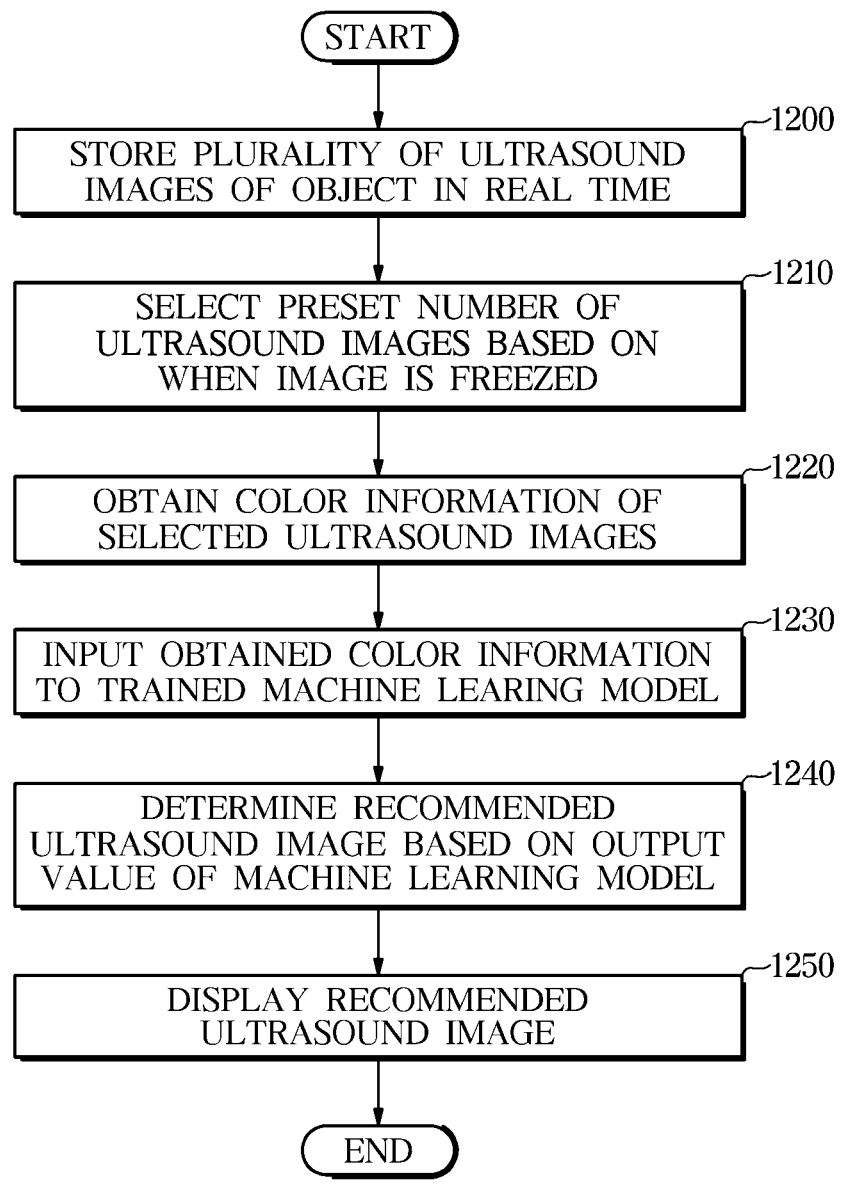

ULTRASOUND DIAGNOSTIC APPARATUS AND METHOD FOR CONTROLLING THE SAME

CROSS-REFERENCE TO RELATED APPLICATION

This application is based on and claims priority under 35 U. S. C. § 119 to Korean Patent Application No. 10-2022-0185040 filed on Dec. 26, 2022, the disclosure of which is incorporated herein by reference in its entirety.

BACKGROUND

1. Field

The disclosure relates to an ultrasound diagnostic apparatus that receives an ultrasound image from a probe and a method for controlling the ultrasound diagnostic apparatus.

2. Discussion of Related Art

An ultrasound diagnostic apparatus is a device for obtaining an image of a portion inside an object by irradiating an ultrasound signal produced from a transducer of an ultrasound probe from a surface of the object toward the target portion inside and receiving information of an ultrasound signal (ultrasonic echo signal) reflected from the object.

The ultrasound diagnostic apparatus is highly stable as compared to an X-ray imaging device because of no exposure to radiation, able to display an image in real time, inexpensive as compared to a magnetic resonance imaging device and movable, thereby being widely used in medical diagnostic fields.

The ultrasound diagnostic apparatus may obtain a doppler image that represents a moving object by using the doppler effect, and the user may input an image freeze command to display a desired still image during motion of the object.

In this process, as for a fast moving object, the freeze command is input after the desired still image passes, leading to a failure to display the desired still image.

SUMMARY

The disclosure provides an ultrasound diagnostic apparatus and method for controlling the same, capable of displaying an optimal image frame desired by the user among color doppler image frames as a freeze image.

According to an embodiment, an ultrasound diagnostic apparatus includes a probe configured to transmit an ultrasound signal to an object and receive an ultrasound echo signal reflected from the object, a display module, an input device, a storage, and a controller configured to obtain a plurality of color doppler image frames based on processing of the echo signal, store the plurality of color doppler image frames in the storage, and control the display module to sequentially display the plurality of color doppler image frames, wherein the controller is configured to determine a recommended color doppler image frame based on color mapping information of the plurality of color doppler image frames in response to receiving an image freeze command through the input device, and control the display module to display the recommended color doppler image frame as a freeze image.

The controller may determine the recommended color doppler image frame among a reference number of color doppler image frames obtained before or after receiving the image freeze command.

The controller may determine one of the reference number of color doppler image frames which has a highest color mapping value included in the color mapping information as the recommended color doppler image frame.

The controller may determine a color doppler image frame having a color mapping value included in the color mapping information equal to or greater than a reference value as the recommended color doppler image frame.

The controller may obtain a machine learning model trained with the plurality of color doppler image frames and the recommended color doppler image frame as input values.

The controller may determine the recommended color doppler image frame based on an output value of the trained machine learning model.

Based on the recommended color doppler image being in the plural, the controller may display a recommended color doppler image closest to a time when the image freeze command is received on the display module.

According to an embodiment, a method of controlling an ultrasound diagnostic apparatus including a probe for transmitting an ultrasound signal to an object and receiving an ultrasound echo signal reflected from the object, a display module, an input device, and a storage, includes obtaining a plurality of color doppler image frames based on processing of the echo signal, storing the plurality of color doppler image frames in the storage, and sequentially displaying the plurality of color doppler image frames on the display module, determining a recommended color doppler image frame based on color mapping information of the plurality of color doppler image frames in response to receiving an image freeze command through the input device, and controlling the display module to display the recommended color doppler image frame as a freeze image.

The determining of the recommended color doppler image frame may include determining the recommended color doppler image frame among a reference number of color doppler image frames obtained before or after receiving the image freeze command.

The determining of the recommended color doppler image may include determining one of the reference number of color doppler image frames which has a highest color mapping value included in the color mapping information as the recommended color doppler image frame.

The determining of the recommended color doppler image may include determining a color doppler image frame having a color mapping value included in the color mapping information equal to or greater than a reference value as the recommended color doppler image frame.

The method may further include obtaining a machine learning model trained with the plurality of color doppler image frames and the recommended color doppler image frame as input values.

The determining of the recommended color doppler image may include determining the recommended color doppler image frame based on an output value of the trained machine learning model.

The method may further include, based on the recommended color doppler image being in the plural, displaying a recommended color doppler image closest to a time when the image freeze command is received on the display module.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 12 is a control flow chart of a control method using an artificial neural network in a method of controlling an ultrasound diagnostic apparatus, according to an embodiment of the disclosure;

DETAILED DESCRIPTION OF EXEMPLARY EMBODIMENTS

Figure 1:
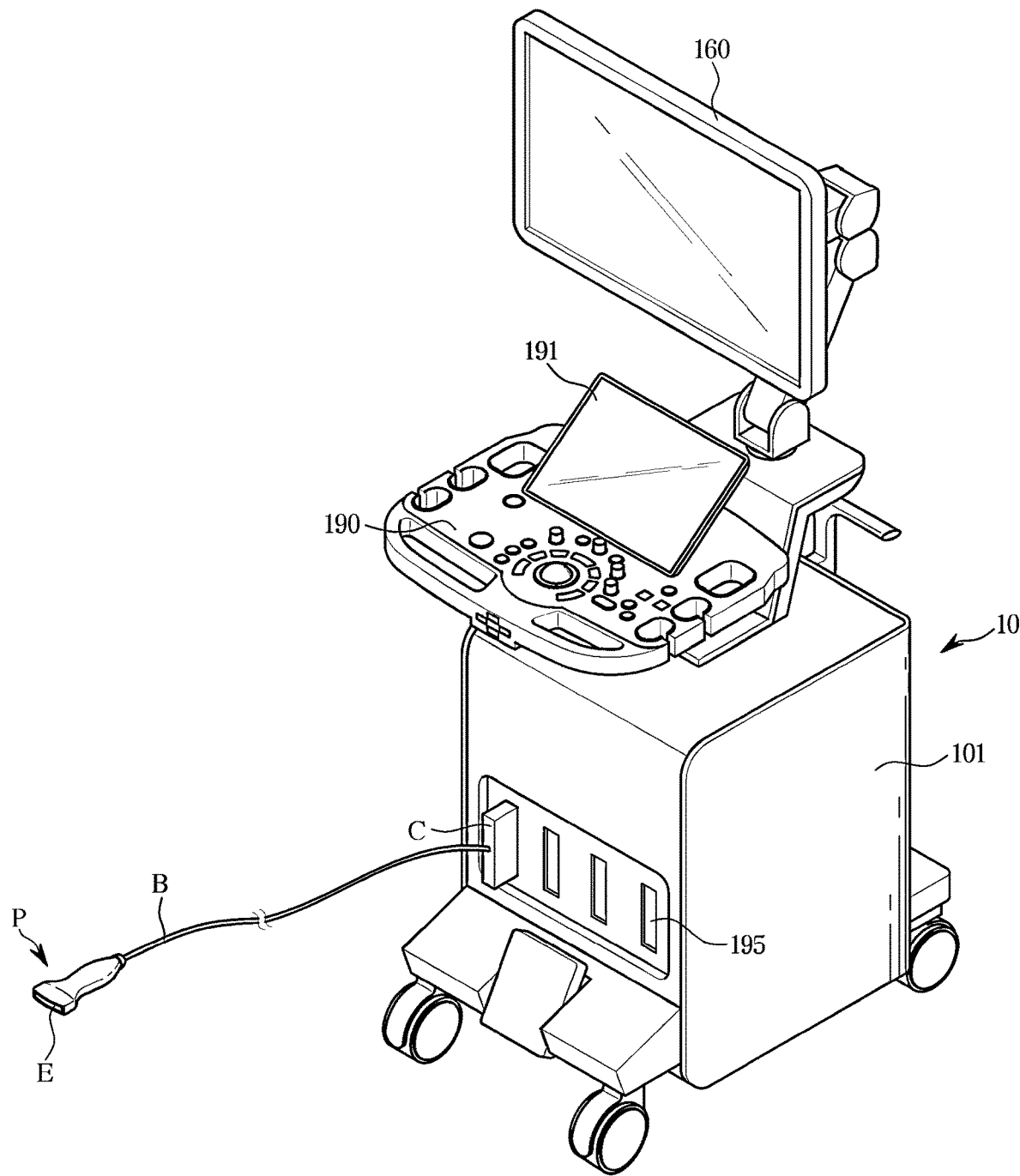
FIG. 1 is an exterior perspective view of an ultrasound diagnostic apparatus, according to an embodiment of the disclosure.

Like numerals refer to like elements throughout the specification. Not all elements of embodiments of the disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

A working principle and embodiments of the disclosure will now be described with reference to accompanying drawings.

FIG. 1 is an exterior perspective view of an ultrasound diagnostic apparatus 10, according to an embodiment.

Referring to FIG. 1, the ultrasound diagnostic apparatus 10 may be connected to a probe P that transmits an ultrasound signal to an object, receives an echo ultrasound signal from the object and converts the echo ultrasound signal to an electric signal.

The ultrasound diagnostic apparatus 10 may be connected to the probe P over a wired communication network or a wireless communication network. The ultrasound diagnostic apparatus 10 may be a workstation equipped with a display module 160 and an input device 190. Furthermore, the ultrasound diagnostic apparatus 10 may exchange various information with an external device over a wired communication network or a wireless communication network.

The input device 190 may receive various control commands such as commands to operate the connected probe P and operate the ultrasound diagnostic apparatus 10 that creates an ultrasound image. The input device 190 may be implemented with various hardware devices such as a keyboard, a foot switch or a foot pedal. For example, when the input device 190 is implemented with a keyboard, the keyboard may include at least one of a switch, a key, a joystick and a trackball.

With the traditional ultrasound diagnostic apparatus, the user may go past a desired frame when he/she presses a freeze key to freeze an image, in which case the user needs to additionally manipulate the trackball to select the desired frame. On the other hand, an ultrasound diagnostic apparatus according to an embodiment may automatically select a frame to which color is properly mapped to solve the above problem, and an associated control method will be described later in detail.

In another example of the input device 190, the keyboard may be implemented in software, such as a graphic user interface. In this case, the keyboard may be displayed through a second display module. A foot switch or foot pedal may be placed under the ultrasound diagnostic apparatus 10, and the user may use the foot pedal to control an operation of the ultrasound diagnostic apparatus 10.

The display module 160 may display an ultrasound image and various graphic user interface (GUI) created by the ultrasound diagnostic apparatus 10.

The ultrasound image displayed on a first display module may be a two dimensional (2D) ultrasound image or a three dimensional (3D) stereoscopic ultrasound image, and various ultrasound images may be displayed according to the operation mode of the ultrasound diagnostic apparatus 10. Furthermore, the first display module may display not only menus or instructions required for ultrasound diagnosis but also information about an operation state of the probe P.

A second display module 191 may be arranged at the top end of the input device 190, and may display information input by the input device 190 separately from the ultrasound image. Specifically, the second display module 191 may display a control panel in the form of a GUI to control displaying of an ultrasound image. The second display module 191 may receive data to control displaying of the image through the control panel displayed in the form of the GUI and may be implemented with a touch screen.

Furthermore, the second display module may provide associated information such as an auxiliary image or a menu to optimize the ultrasound image. When the second display module serves as the input device 190, a GUI of the same shape as buttons included in the input device 190 may be displayed on the second display module.

The shape of the ultrasound diagnostic apparatus 10 is not, however, limited to what is shown in FIG. 1. For example, the ultrasound diagnostic apparatus 10 may be implemented in the form of not only a laptop, a desktop, a tablet personal computer (PC) but also a smart phone. Furthermore, the ultrasound diagnostic apparatus 10 may be implemented in the form of a mobile terminal such as a personal digital assistant (PDA) and a wearable terminal in the shape of a watch or glasses that may be detachably worn on the body of the user.

An object may be a human or animal body, or a tissue in the body such as a blood vessel, bone, muscle, etc., without being limited thereto, and may be anything whose internal structure may be imaged by the ultrasound diagnostic apparatus 10. The probe P may be equipped in the housing to irradiate ultrasound to the object and receive echo ultrasound reflected from the object, and may include a transducer for converting an electric pulse signal to ultrasound or vice versa, a male connector C physically coupled to a female connector 195 of the ultrasound diagnostic apparatus 10 to transmit or receive a signal to or from the ultrasound diagnostic apparatus 10, and a cable B connecting the probe P to the ultrasound diagnostic apparatus 10.

The transducer may produce ultrasound according to alternate current (AC) power applied. Specifically, the transducer may receive AC power from a power storage device in the probe P, e.g., a battery. A vibrator of the transducer (hereinafter, a transducer element) may vibrate according to the supplied AC power to produce ultrasound.

The transducer receives a signal reflected off the object, i.e., echo ultrasound. The transducer converts the echo ultrasound to an electric signal. The echo ultrasound has various frequency bands or energy intensities to create various ultrasound images according to the diagnosis mode.

The probe P transmits the ultrasound, analog signal or digital signal converted by each element 21 of the transducer to the ultrasound diagnostic apparatus 10 through the cable B. The probe P in the disclosure is not, however, always connected to the ultrasound diagnostic apparatus 10 through the cable B. The probe P and the ultrasound diagnostic apparatus 10 may transmit or receive signals through wired or wireless communication.

The ultrasound diagnostic apparatus 10 includes a probe select assembly (PSA) board for receiving a signal transmitted by the probe P. The PSA board may include a plurality of female connectors 195 to be connected to a plurality of probes P, and may include a switching module and a plurality of channels therein.

Figure 2:
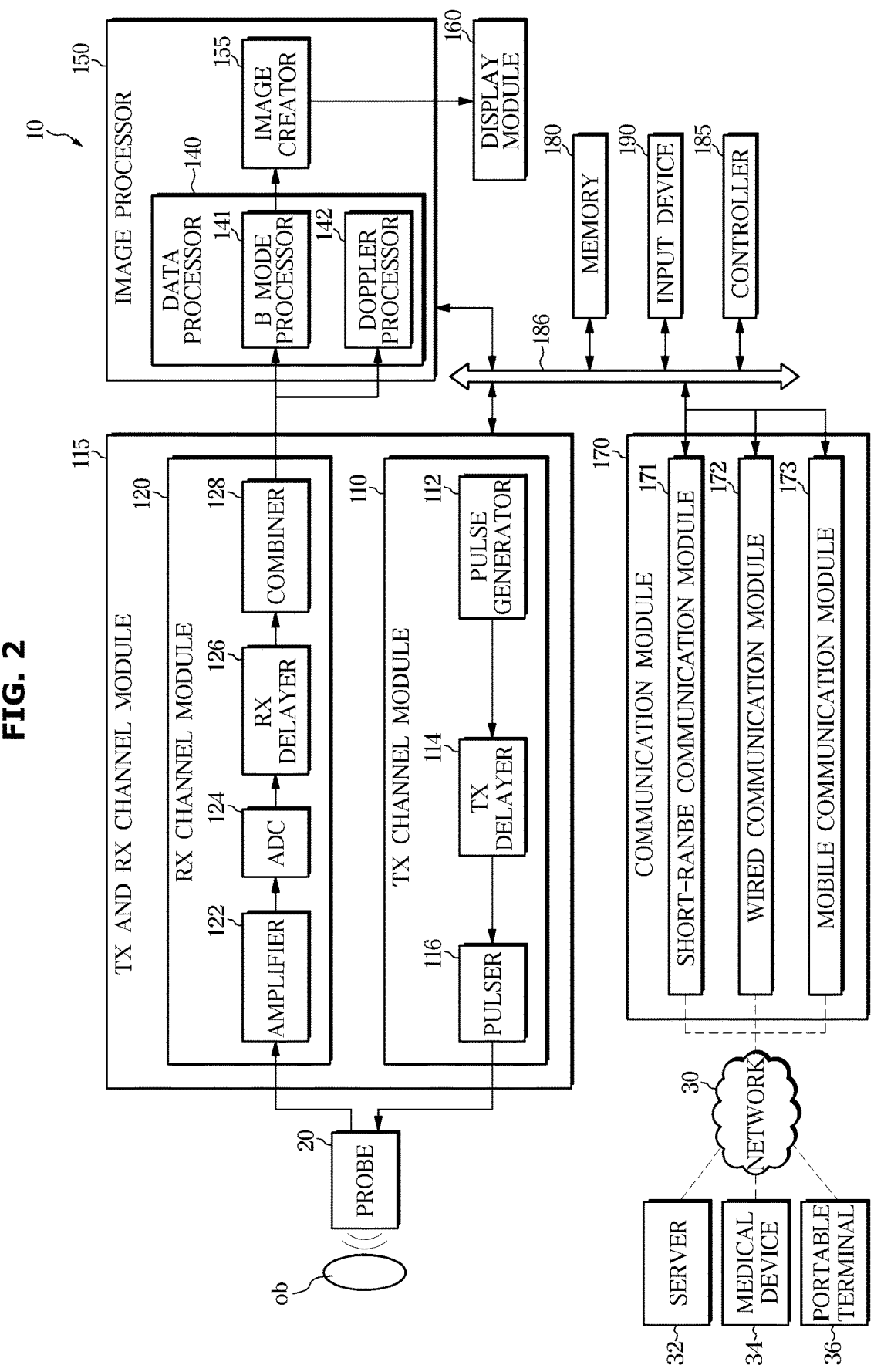
FIG. 2 is a control block diagram of an ultrasound diagnostic apparatus, according to an embodiment of the disclosure.

FIG. 2 is a control block diagram of an ultrasound diagnostic apparatus, according to an embodiment.

Referring to FIG. 2, the ultrasound diagnostic apparatus 10 in an embodiment may include an ultrasound transmission and reception channel module 115, an image processor 150, a communication module 170, the display module 160, the memory 180, the input device 190, and a controller 185, which may be interconnected through a bus 186.

Although the ultrasound diagnostic apparatus 10 is shown in FIG. 2 as being connected to one probe P, the ultrasound diagnostic apparatus 10 may include a plurality of probes P when an adapter 20 coupled to the plurality of probes P is connected thereto.

The ultrasound transmission and reception channel module 115 may include a plurality of transmission channels and a plurality of reception channels.

The probe P may transmit an ultrasound signal (transmission signal) to an object ob according to a driving signal applied from the ultrasound transmission and reception channel module 115, and receive an ultrasound signal (echo signal) reflected from the object ob.

The probe P includes a transducer that produces ultrasound which is acoustic energy, by vibrating according to an electric signal sent from the ultrasound diagnostic apparatus 10.

A transmission channel module 110 may include a plurality of transmission channels for supplying driving signals to the probe P, and include a pulse generator 112, a transmission delayer 114, and a pulser 116. The pulse generator 112 may generate pulses to form transmission ultrasound with a certain pulse repetition frequency (PRF), and the transmission delayer 114 may apply a delay time for determining transmission directionality to the pulses. Each pulse with the delay time applied thereto may correspond to one of a plurality of piezoelectric elements included in the probe P.

In other words, the transmission channel module 110 may include a plurality of transmission channels connected to the piezoelectric elements included in the transducer, and deliver transmission signals to the piezoelectric elements through the respective transmission channels.

In various embodiments, each of the plurality of transmission channels may correspond to at least one piezoelectric element. For example, one of the plurality of transmission channels may send a transmission signal to one or more piezoelectric elements.

The pulser 116 may apply a driving signal (or driving pulse) to the prove P at a time corresponding to each pulse with the delay time applied thereto.

A reception channel module 120 may include a plurality of reception channels for processing the ultrasound signal (echo signal) received from the probe P to generate ultrasound data, and may include an amplifier 122, an analog-to-digital converter (ADC) 124, a reception delayer 126, and a combiner 128. The amplifier 122 amplifies the echo signal for each reception channel, and the ADC 124 performs analog-to-digital conversion on the amplified echo signal.

The reception delayer 126 applies a delay time for determining reception directionality to the digitized echo signal, and the combiner 128 generates ultrasound data by combining echo signals processed by the reception delayer 126. Alternatively, the reception channel module 120 may not include the amplifier 122 depending on the form of implementation. Specifically, when sensitivity of the probe P increases or the number of process bits of the ADC 124 increases, the amplifier 122 may be omitted.

The image processor 150 may generate an ultrasound image through a scan conversion process on the ultrasound data generated by the ultrasound transmission and reception channel module 115.

The ultrasound image may be not only a gray scale ultrasound image obtained by scanning the object ob in an amplitude mode (A mode), a brightness mode (B mode) and a motion mode (M mode) but also a doppler image that represents the moving object ob using the doppler effect. The doppler image may include a blood flow doppler image (or also called a color flow image) that represents a flow of blood, a tissue doppler image that represents motion of a tissue, and a spectral doppler image that represents moving speed of the object ob in a waveform.

In an embodiment, the ultrasound diagnostic apparatus 10 may determine a recommended color doppler image frame among a reference number of color doppler image frames obtained before or after receiving a freeze command and display the recommended color doppler image frame on the display module 160 when the freeze command is received from the user while displaying the plurality of color doppler image frames on the display module 160.

A method by which the controller 185 detects a frame to which color is optimally mapped to determine the recommended color doppler image frame will now be described.

In an embodiment, the controller 185 may determine the recommended color doppler image frame to be an image having the widest color area in a region of interest (ROI) among up to 10 frame images from a time when the user inputs the freeze command. Assuming a time when the user inputs the freeze command corresponding to an optimal frame desired by the user, there may be an optimal frame desired by the user included in the up to 10 frame images even though there is an image delay.

Furthermore, the user may select one of a retrospective image range, a prospective image range or a retrospective plus prospective image range based on the time when the freeze command is input as a candidate image range to determine the recommended color doppler image frame.

In another embodiment, the controller 185 may determine the recommended color doppler image frame to be a frame to which color is mostly mapped in a blood vessel, which is an anechoic portion in a color box based on the B mode. Specifically, as the blood vessel is unechoically represented in black series in the B mode, the controller 185 may determine the unechoic portion as a blood vessel, and determine the recommended color doppler image frame to be a frame to which color is mostly mapped in the blood vessel.

In another embodiment, the controller 185 may determine the recommended color doppler image frame to be an image at a maximum diastolic time based on electrocardiogram (ECG). During the heart ultrasound, the volume of the heart is maximized at the maximum diastolic time and blood is mostly mapped, so an image at the maximum diastolic time may be determined as the frame to which color is mostly mapped.

In another embodiment, the controller 185 may determine a section to the blood vessel wall from a direction perpendicular to or at an acute angle of a direction of a sample volume (SV) gate in a BCD simultaneous mode that represents all the B, C and D modes at the same time as a diameter of the vessel, and determine the recommended color doppler image frame to be a frame to which color is mapped in the widest range based on the diameter of the vessel.

In other words, as the user sets the direction of the SV gate to correspond to the blood flow direction, a direction perpendicular to or at an acute angle of the direction of the SV gate may be the direction perpendicular to the blood vessel wall. Hence, the controller 185 may determine the recommended color doppler frame to be a frame to which color is mostly mapped in the section to the blood vessel wall based on the direction perpendicular to or at an acute angle of the direction of the SV gate.

In another embodiment, the controller 185 may determine a portion having motion at regular intervals in the B mode or having color mapped thereto at regular intervals as a blood flow, and determine a frame to which color is maximally mapped in an area of question within a preset period as the recommended color doppler image frame.

In other words, noise often occurs randomly without having a regular rule, so the controller 185 may determine that a region to which color is mapped with a regular rule is not noise but a blood vessel. The controller 185 may then determine the frame to which color is maximally mapped as the recommended color doppler image frame by determining an extent of color mapping in the region determined as the blood vessel.

In another embodiment, the controller 185 may control the display module 160 to display a plurality of candidate frames of the recommended color doppler image frame before or after the time when the user inputs the freeze command. In other words, the controller 185 may display candidate frames on the display module 160 for the user to directly select a desired optimal frame. This may allow user to select one of the candidate frames displayed on the display module 160, thereby gaining an effect of reflecting the user's intention.

In another embodiment, the controller 185 may determine the recommended color doppler image frame to be a frame to which color is maximally mapped in the ROI within a reference range set by the user through the input device 190.

For example, assuming that the human heart beats once a second, the user may set the reference range to 1 second, and determine the recommended color doppler image frame to be a frame to which color is maximally mapped in the ROI of an image within less than 1 second from the time when the freeze command is input. In this regard, as the frame rate is lowered in the BCD simultaneous mode, the user may obtain frames by adding extra time to the reference range set by the user.

In another embodiment, the controller 185 may select a frame having the least color speckle noise, which is irregularly mapped to where there is no blood flow in a region recognized as no blood flow, represented therein, as the recommended color doppler image frame. In other words, the controller 185 may display an image frame having the least noise on the display module 160, allowing the user to make diagnosis with the clear image without noise.

In another embodiment, the controller 185 may determine that a frame with pixels having a gray level equal to or higher than a certain brightness growing rapidly as compared to other image frames is a frame that has a blurred image and makes it difficult to identify a structure in the procedure for determining the recommended color doppler image frame, and exclude the frame from candidates of the recommended color doppler image frame.

In another embodiment, the controller 185 may determine a portion where an echo signal similar to an echo signal of a region where an SV gate is located is located in more than a certain area as a blood flow because the user places the SV gate on the blood flow in a pulsed wave (PW) mode. The controller 185 may then determine the frame to which color is maximally mapped in a region determined as the blood flow as the recommended color doppler image frame.

As such, the method by which the controller 185 determines the recommended color doppler image frame in an embodiment is not limited to one, but there may be various methods for detecting a frame to which color is optimally mapped.

The data processor 140 may process ultrasound data.

A B mode processor 141 extracts and processes a B-mode component from the ultrasound data. An image creator 155 may create an ultrasound image with signal intensity represented in brightness based on the B-mode component extracted by the B mode processor 141.

Similarly, the doppler processor 142 may extract a doppler component from the ultrasound data, and the image creator 155 may create a doppler image (e.g., a color flow image) with motion of the object ob represented in color or waveform based on the extracted doppler component.

The image creator 155 may create a 3D ultrasound image through a volume rendering procedure for volume data, and also create an elastic image that images a degree of deformation of the object ob caused by pressure.

Furthermore, the image creator 155 may represent various additional information on the ultrasound image in text and graphics. The created ultrasound image may be stored in the memory 180.

The ultrasound image created by the image creator 155 may be output on the display module 160.

The communication module 170 is connected to a network 30 wiredly or wirelessly to communicate with an external device or a server. The communication module 170 may exchange data with a hospital server or another medical device in the hospital connected through a picture archiving and communication system (PACS). Furthermore, the communication module 170 may perform data communication according to the digital imaging and communications in medicine (DICOM) standard.

The communication module 170 may transmit or receive data related to diagnosis on the object ob, such as an ultrasound image of the object ob, ultrasound data, doppler data, etc., over the network 30, and also transmit or receive a medical image captured by another medical device such as computerized tomography (CT), magnetic resonance imaging (MRI), X-ray, etc. Furthermore, the communication module 170 may receive information about examination history or treatment schedule of a patient from the server and make use of the information for diagnosis on the object ob. Moreover, the communication module 170 may perform data communication not only with a server or a medical device in the hospital but also a portable terminal of a doctor or a patient.

The communication module 170 may transmit an ultrasound image to an external device over the network 30. In this case, when a plurality of ultrasound images are obtained, each ultrasound image may be treated as a single image and transmitted to the external device.

The communication module 170 may be wiredly or wirelessly connected to the network 30 to exchange data with a server 32, a medical device 34, or a portable terminal 36. The communication module 170 may include one or more components that enable communication with an external device, for example, a short-range communication module 171, a wired communication module 172, and a mobile communication module 173.

The short-range communication module 171 refers to a module for short-range communication within a certain range. In an embodiment of the disclosure, short-range communication technologies may include a wireless local area network (WLAN), wireless fidelity (Wi-Fi), bluetooth, zigbee, Wi-Fi Direct (WFD), ultra wideband (UWB), infrared data association (IrDA), bluetooth low energy (BLE), near field communication (NFC), etc., without being limited thereto.

The wired communication module 172 refers to a module for communication using electric signals or optical signals, and in an embodiment may include a pair cable, a coaxial cable, a fiber-optic cable, an ethernet cable, etc.

The mobile communication module 173 transmits or receives wireless signals to or from at least one of a base station, an external terminal, or a server in a mobile communication network. The wireless signal may include a voice call signal, a video call signal or different types of data involved in transmission/reception of a text/multimedia message.

The memory 180 stores various information processed by the ultrasound diagnostic apparatus 10. For example, the memory 180 may store medical data involved with diagnosis of the object ob such as input/output ultrasound data or ultrasound image, and also store an algorithm or program performed in the ultrasound diagnostic apparatus 10.

The memory 180 may be implemented with various types of storage media such as a hard disk, electrically erasable and programmable read only memory (EEPROM), etc. Furthermore, the ultrasound diagnostic apparatus 10 may operate a web storage or a cloud server that performs a storage function of the memory 180 on a web.

The input device 190 refers to a means that receives data from the user to control the ultrasound diagnostic apparatus 10. The input device 190 may include a hardware component such as a keypad, a mouse, a touch pad, a track ball, a jog switch, etc. The input device 190 may also include a fingerprint recognition sensor to recognize a fingerprint of the user. Besides, the input device 190 may further include various components such as an ECG measurement module, a respiratory measurement module, a voice recognition sensor, a gesture recognition sensor, an iris recognition sensor, a depth sensor, a range sensor, etc. Especially, a touch screen having a touch pad forming a mutual layer structure with the aforementioned display module 160 may also be included.

The controller 185 controls general operation of the ultrasound diagnostic apparatus 10. Specifically, the controller 185 may control operations between the probe P, the ultrasound transmission and reception channel module 115, the image processor 150, the communication module 170, the memory 180 and the input device 190 as shown in FIG. 2.

The controller 185 may include at least one processor (not shown) for obtaining data required for control from the at least one memory 180 that stores a program for carrying out the following operations, and execute the stored program. The ultrasound transmission and reception channel module 115, the image processor 150 and the controller 185 may each use the separate memory 180 and processor or may share the memory 180 and the processor.

Specifically, the controller 185 may determine a recommended color doppler image frame based on color mapping information of a plurality of color doppler image frames in response to receiving an image freeze command through the input device 190, and control the display module 160 to display the recommended color doppler image frame as a freeze image.

The controller 185 may determine the recommended color doppler image frame among a reference number of color doppler image frames obtained before or after receiving the image freeze command.

The controller 185 may determine one of the reference number of color doppler image frames which has the highest color mapping value included in the color mapping information as the recommended color doppler image frame.

The controller 185 may determine a color doppler image frame having a color mapping value included in the color mapping information equal to or greater than a reference value as the recommended color doppler image frame.

The controller 185 may obtain a machine learning model trained with the plurality of color doppler image frames and the recommended color doppler image frame as input values, and determine a recommended color doppler image frame based on an output value of the trained machine learning model.

Based on the recommended color doppler image being in the plural, the controller 185 may display a recommended color doppler image closest to a time when the image freeze command is received on the display module 160.

All or some of the probe P, the ultrasound transmission and reception channel module 115, the image processor 150, the display module 160, the communication module 170, the memory 180, the input device 190 and the controller 185 may be operated by a software module, without being limited thereto, and some of the aforementioned components may be operated in hardware. Furthermore, at least some of the ultrasound transmission and reception channel module 115, the image processor 150 and the communication module 170 may be incorporated in the controller 185, but are not limited thereto.

The probe P connected to the slot 195 delivers identification information of the probe P (e.g., identification number information, information about a type of the probe P, etc.) to the ultrasound diagnostic apparatus 10 through a cable, and the ultrasound diagnostic apparatus 10 provides a user interface for selecting the probe P on the display module 160 based on the identification information of the probe P. Hence, an operator may select the probe P to be used by the operator through the user interface, and an image created based on an ultrasound signal obtained from the selected probe P is output to the display module 160.

How the ultrasound diagnostic apparatus 10 obtains color doppler image frames and automatically displays a color doppler image frame to which color is most optimally mapped when the freeze command is input will now be described according to an embodiment.

FIGS. 3 to 7 illustrate a frame at a time when a freeze command is input and an optimal color doppler image frame in an ultrasound diagnostic apparatus, according to an embodiment.

The ultrasound diagnostic apparatus 10 according to an embodiment may obtain ultrasound data of the object ob by irradiating an ultrasound signal to the object ob and receiving an echo signal to the irradiated ultrasound signal.

The ultrasound image created with the ultrasound data as described above may include a color doppler image that represents the moving object ob using the doppler effect.

The image processor 150 may obtain the color doppler signal by filtering the ultrasound echo signal to create the color doppler image, obtain a plurality of successive doppler image frames based on the color doppler signal, and create a doppler image based on the plurality of doppler image frames.

The controller 185 may set an ROI in the color doppler image, in which case various locations, sizes and shapes of the ROI may be set. For example, the controller 185 may receive a user input to set an ROI, and display the location, size and shape of the ROI on the display module 160 based on the user input.

With the traditional ultrasound diagnostic apparatus 10, the user may scan the object ob by using the probe P to obtain a color doppler image. The user may determine whether a color doppler image frame required for diagnosis is obtained by checking the display module 160 while scanning the object ob.

When the color doppler image frame required for diagnosis is determined to be obtained, the user may operate the input device 190 to display the color doppler image frame required for diagnosis as the freeze image. For example, the user may press a freeze button to display the color doppler image frame required for diagnosis as the freeze image.

However, when the object ob moves a lot, for example, when the pulse of such a first trimester fetus beats fast, it may be difficult to press the freeze button timely when color has been mapped. In other words, to display a freeze image to which color is suitably mapped when the object ob moves a lot or fast, the user needs to operate the input device 190 such as a track ball to check frames stored before/after the freeze point and change a target frame to be displayed.

On the other hand, in the ultrasound diagnostic apparatus 10 according to an embodiment, the controller 185 may determine a recommended color doppler image frame based on color mapping information of the color doppler image frame, and replace a color doppler image frame currently displayed with the recommended color doppler image frame. Accordingly, unlike the traditional ultrasound diagnostic apparatus 10, the ultrasound diagnostic apparatus 10 according to the embodiment may display a frame to which color is mapped most optimally on the display module 160 without intervention of the user after the user presses the freeze button, thereby increasing user convenience.

Figure 3:
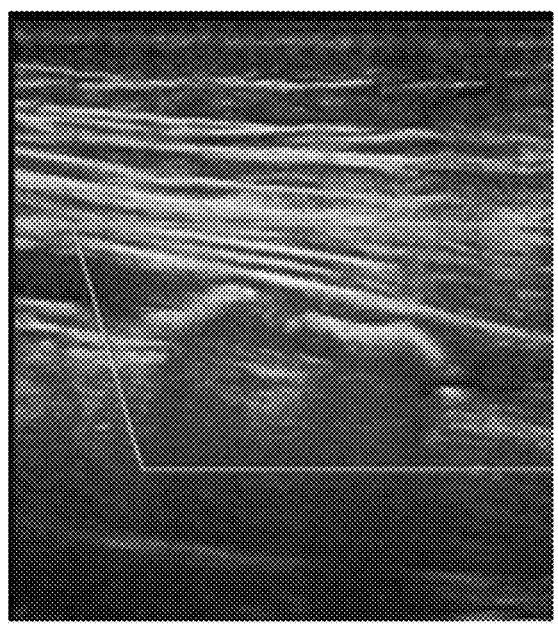
FIGS. 3 to 7 illustrate a frame at a time when a freeze command is input and an optimal color doppler image frame in an ultrasound diagnostic apparatus, according to an embodiment of the disclosure.
Figure 3:
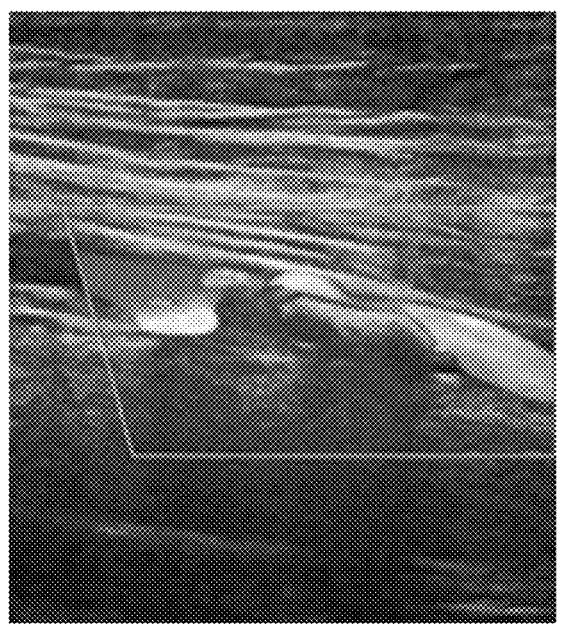

Referring to FIG. 3, (a) of FIG. 3 shows a frame at a time when blood is not mapped displayed on the display module 160 even when the user inputs a freeze command by pressing the freeze button to observe a flow of the blood in an ROI of a color doppler image.

On the other hand, (b) of FIG. 3 shows a color doppler image frame required by the user to diagnose the object ob, with which a flow of blood may be determined from the object ob because sufficient color is mapped and a rupture of a blood vessel may be determined by checking branching of the blood.

Even when the color doppler image frame at an instant when the user inputs the freeze command is of an empty blood vessel to which no blood is mapped as in (a) of FIG. 3, it may be replaced by a color doppler image frame to which blood is properly mapped as in (b) of FIG. 3 to be displayed on the display module 160.

Accordingly, diagnosis may be speeded up and concentration is improved because there is no need for the user of the ultrasound diagnostic apparatus 10 according to an embodiment to separately operate the input device, thereby leading to a precise diagnosis.

Figure 4:
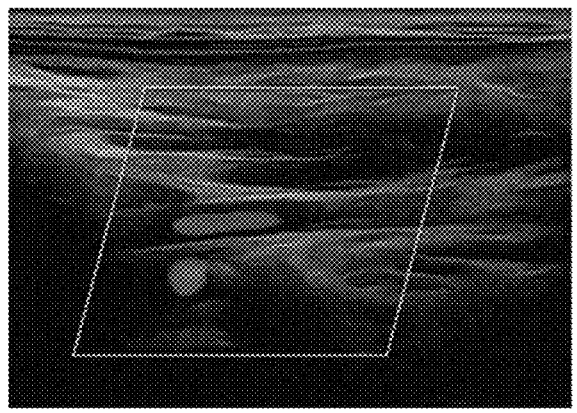
Figure 4:
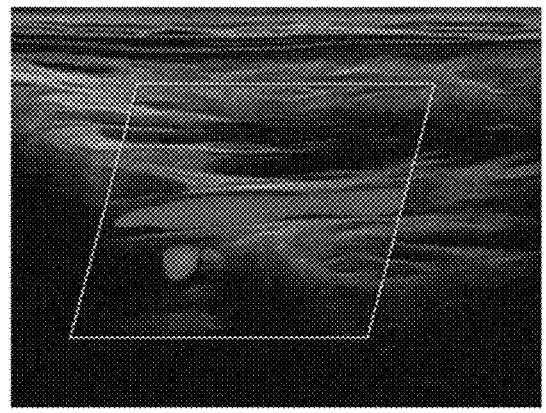

Referring to FIG. 4, (a) of FIG. 4 shows a frame at a time when blood is not maximally mapped displayed on the display module 160 even when the user inputs a freeze command by pressing the freeze button.

On the other hand, (b) of FIG. 4 shows a color doppler image frame required by the user to diagnose the object ob, which may be a frame at a time when color is maximally mapped.

According to the ultrasound diagnostic apparatus 10 according to an embodiment, even when the user inputs the freeze command at the time of (a) of FIG. 4, the color doppler image frame at the time of (b) of FIG. 4 may be displayed on the display module 160, so that the user may determine whether a blood flow is smooth, when the blood is maximally mapped.

Figure 5:
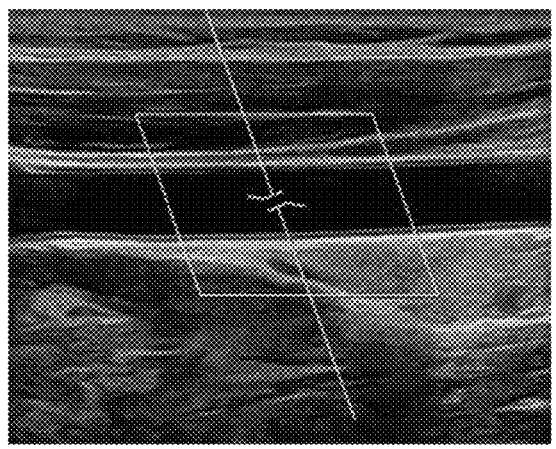
Figure 5:
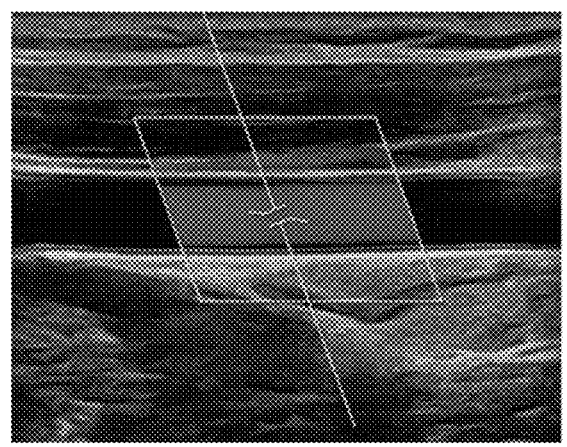

Referring to FIG. 5, similar to (a) of FIG. 3, (a) of FIG. 5 shows a frame at a time when blood is not mapped displayed on the display module 160 even when the user inputs a freeze command by pressing the freeze button.

On the other hand, similar to (b) of FIG. 3, (b) of FIG. 5 shows a color doppler image frame required by the user to diagnose the object ob, which may be a frame at a time when color is maximally mapped.

According to the ultrasound diagnostic apparatus 10 according to an embodiment, even when the user inputs the freeze command at the time of (a) of FIG. 5, the color doppler image frame at the time of (b) of FIG. 5 may be displayed on the display module 160, so that the user may determine a foreign material accumulated on the wall of the blood vessel when the blood is maximally mapped.

Figure 6:
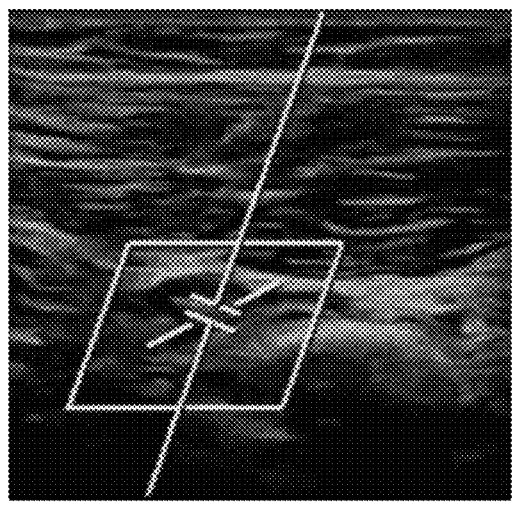
Figure 6:
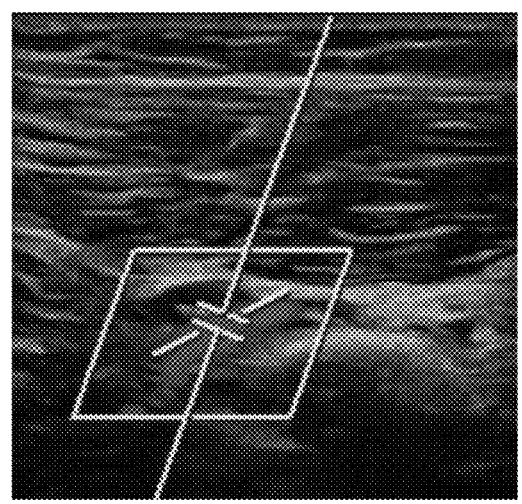

Referring to FIG. 6, similar to (a) of FIG. 3, (a) of FIG. 6 shows a frame at a time when blood is not mapped displayed on the display module 160 even when the user inputs a freeze command by pressing the freeze button.

On the other hand, similar to (b) of FIG. 3, (b) of FIG. 6 shows a color doppler image frame required by the user to diagnose the object ob, which may be a frame at a time when color is maximally mapped.

According to the ultrasound diagnostic apparatus 10 according to an embodiment, even when the user inputs the freeze command at the time of (a) of FIG. 6, the color doppler image frame at the time of (b) of FIG. 6 may be displayed on the display module 160, so that the user may determine whether there is internal bleeding in an ROI of the object ob.

Figure 7:
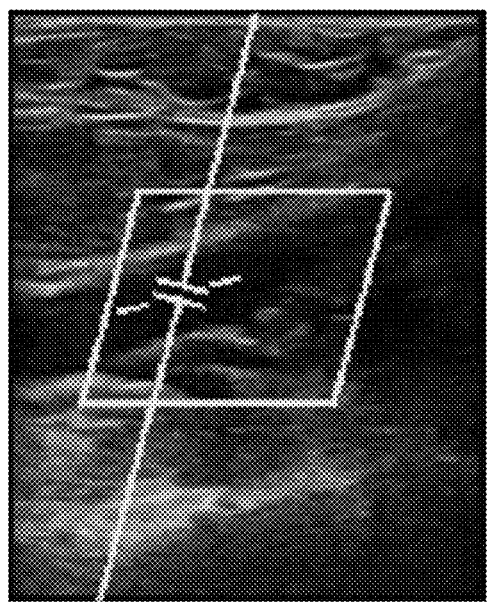
Figure 7:
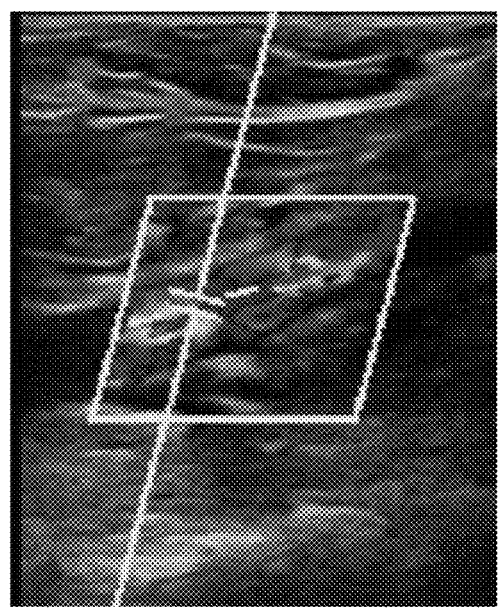

Referring to FIG. 7, (a) of FIG. 7 may be a frame at a time when blood is not mapped, (b) of FIG. 7 may be a frame at a time when color is maximally mapped, and even when a frame at a time when the freeze command is received corresponds to the frame of (a) of FIG. 7, the controller 185 may replace the frame with the frame of (b) of FIG. 7. In this regard, overlapping description will not be repeated.

The color doppler images as described above in connection with FIGS. 3 to 7 are merely examples, and the controller 185 replacing a frame at a time when the freeze command is received with a frame at a time when color is maximally mapped may be equally applied to a complex mode for displaying a 2D ultrasound image, a color doppler image and a pulse wave doppler image together.

Figure 8:
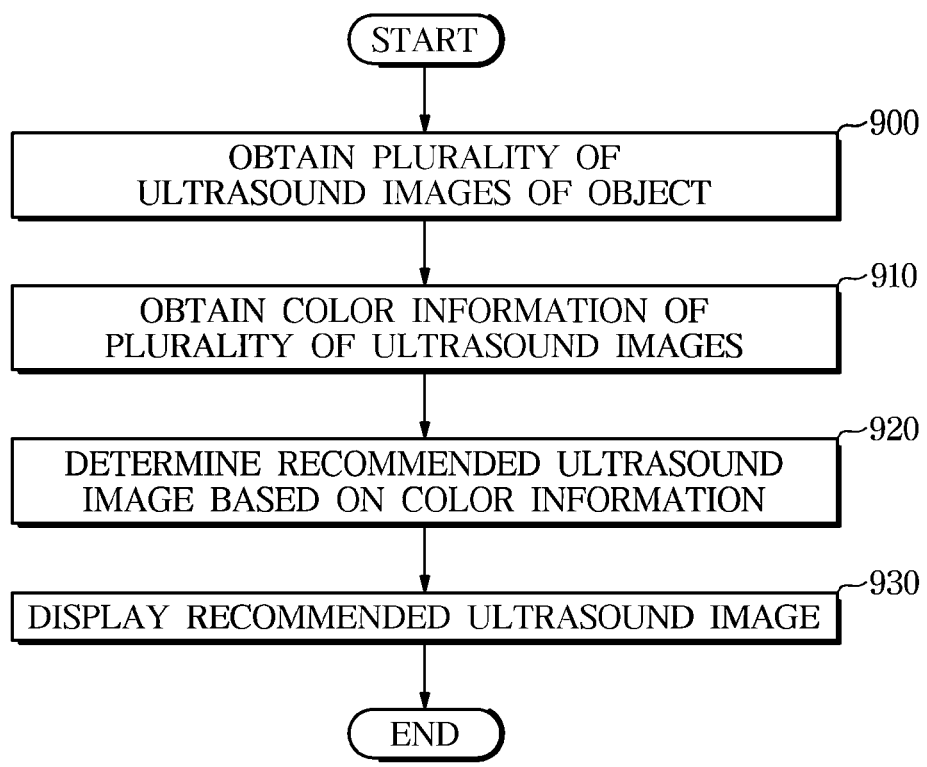
FIG. 8 is a control flow chart of a method of controlling an ultrasound diagnostic apparatus, according to an embodiment of the disclosure.

FIG. 8 is a control flow chart of a method of controlling an ultrasound diagnostic apparatus, according to an embodiment.

Referring to FIG. 8, the controller 185 may obtain a plurality of ultrasound images of the object ob, and among them, obtain a plurality of color doppler images, in 900.

The controller 185 may then obtain color information regarding the plurality of ultrasound images including the color doppler images, in 910. The controller 185 may obtain the color information included in the plurality of color doppler images through a color mapping algorithm or a deep learning model.

The controller 185 may determine a recommended ultrasound image based on the obtained color information in 920, and the recommended ultrasound image refers to a color doppler image frame to which color is mapped most properly. The controller 185 may display the determined recommended ultrasound image on the display module in 930.

The control method described above in connection with FIG. 8 will now be described in more detail.

Figure 9:
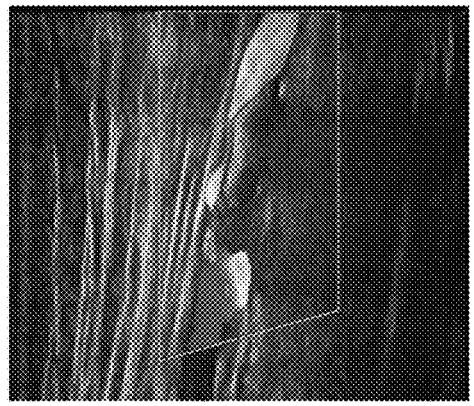
FIG. 9 illustrates a plurality of color doppler image frames stored in a storage of an ultrasound diagnostic apparatus, according to an embodiment of the disclosure.
Figure 9:
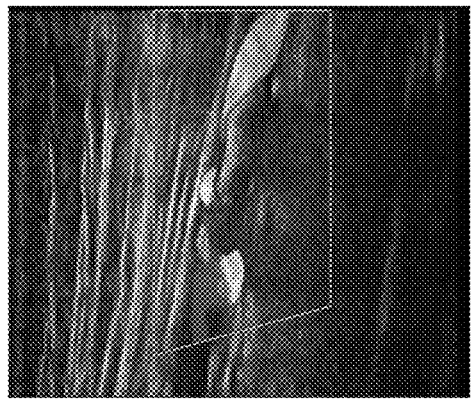
Figure 9:
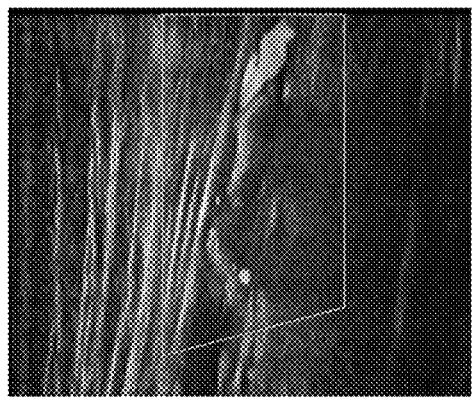
Figure 9:
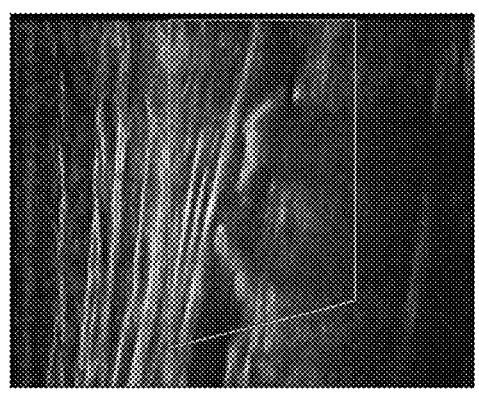

FIG. 9 illustrates a plurality of color doppler image frames stored in a storage of an ultrasound diagnostic apparatus, according to an embodiment.

to (d) of FIG. 9 are color doppler image frames, which are candidates of a recommended color doppler image frame. (a) of FIG. 9 is an image frame in which a middle portion is connected to a right portion in an ROI and color is maximally mapped thereto, (b) of FIG. 9 is an image frame in which the middle portion and the right portion in the ROI are disconnected and color is mapped thereto, and (c) of FIG. 9 is an image frame in which color is mapped more to the right of the ROI, and (d) of FIG. 9 is an image frame to which no color is mapped.

The controller 185 may obtain a reference number of color doppler image frames obtained before or after receiving the image freeze command. For example, the controller 185 may obtain 3 to 4 image frames before or after receiving the image freeze command, and (d) of FIG. 9 may be a color doppler image frame at the time when the image freeze command is received.

The extent of color mapping may decrease from (a) to (d) of FIG. 9, and although the user inputs the freeze command to display the color doppler image frame of (a) of FIG. 9 on the display module 160, the image frame of (d) of FIG. 9 may be displayed on the display module 160 due to a time difference between the image progress and the input of the freeze command.

To correct this, the controller 185 may determine a preset reference number of frames before or after the time of inputting the freeze command, i.e., (d) of FIG. 9, as candidates of a recommended color doppler image frame. However, for convenience of explanation, only 4 frames before (d) of FIG. 9, which is the time of inputting the freeze command, are taken as an example in FIG. 9.

The controller 185 may then determine which frame it is to which color is optimally mapped, according to a color mapping algorithm or a deep learning model.

The controller 185 may analyze the image and determine an extent to which color is mapped for each pixel by processing the image, and determine an extent of color mapping in the ROI. For example, the controller 185 may determine one of the reference number of color doppler image frames having the highest color mapping value as the recommended color doppler image frame, or determine a color doppler image frame having a color mapping value equal to or higher than a reference value as the recommended color doppler image frame.

The color mapping value is a value that numerically represents an extent to which color is mapped in the color doppler image frame, meaning the higher the value the more the color mapping.

As such, the controller 185 may determine using the color mapping algorithm or deep learning model that color is mapped most properly in (a) of FIG. 9, and accordingly determine (a) of FIG. 9 as the recommended color doppler image frame. The controller 185 may then display the recommended color doppler image frame on the display module 160.

Figure 10:
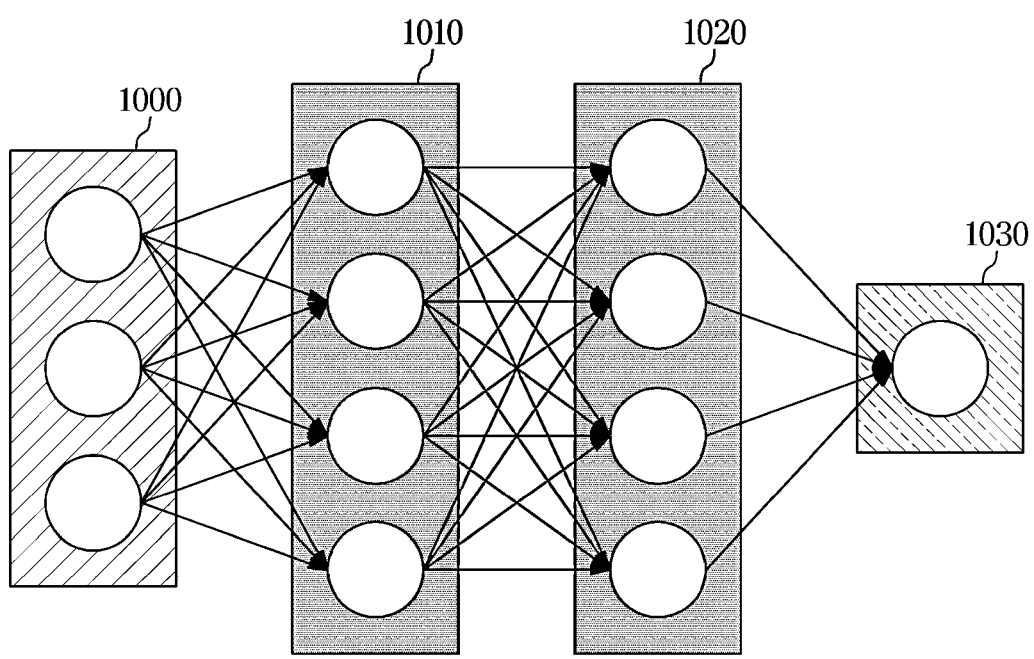
FIG. 10 is a schematic diagram of an artificial neural network used to determine a recommended color doppler image frame in an ultrasound diagnostic apparatus, according to an embodiment of the disclosure.

FIG. 10 is a schematic diagram of an artificial neural network used to determine a recommended color doppler image frame in an ultrasound diagnostic apparatus, according to an embodiment.

Referring to FIG. 10, the artificial neural network may include an input layer 1000, at least one hidden layer 1010 and 1020, and an output layer 1030. Computations through the artificial neural network may be performed by a processor in a server or a processor in the ultrasound diagnostic apparatus 10. The server may be a server for managing software, programs, data, files, etc., used by the ultrasound diagnostic apparatus 10. The processor in the server may store and manage a program including a learning model with which the server determines a recommended color ultrasound image frame. The server may transmit a program including a learning model to the ultrasound diagnostic apparatus 10.

In the meantime, weights between the respective layers and nodes may be trained through learning and training performed in the hidden layer 1010 and 1020. For example, the processor of the server or the processor of the ultrasound diagnostic apparatus 10 may obtain values of weights between nodes and the hidden layers 1010 that determine an optimal color mapping frame through repetitive learning. The processor of the server or the processor of the ultrasound diagnostic apparatus 10 may generate a learning model that determines a color mapping extent included in the color doppler image and detects a recommended color doppler image frame to which color is mostly mapped or most properly mapped in an artificially neural network trained by applying the obtained values of the weights.

In other words, the controller 185 may train a machine learning model with the plurality of color doppler image frames and the recommended color doppler image frame as input values, determine the recommended color doppler image frame based on an output value of the trained machine learning model, and display the determined recommended color doppler image frame on the display module 160.

Figure 11:
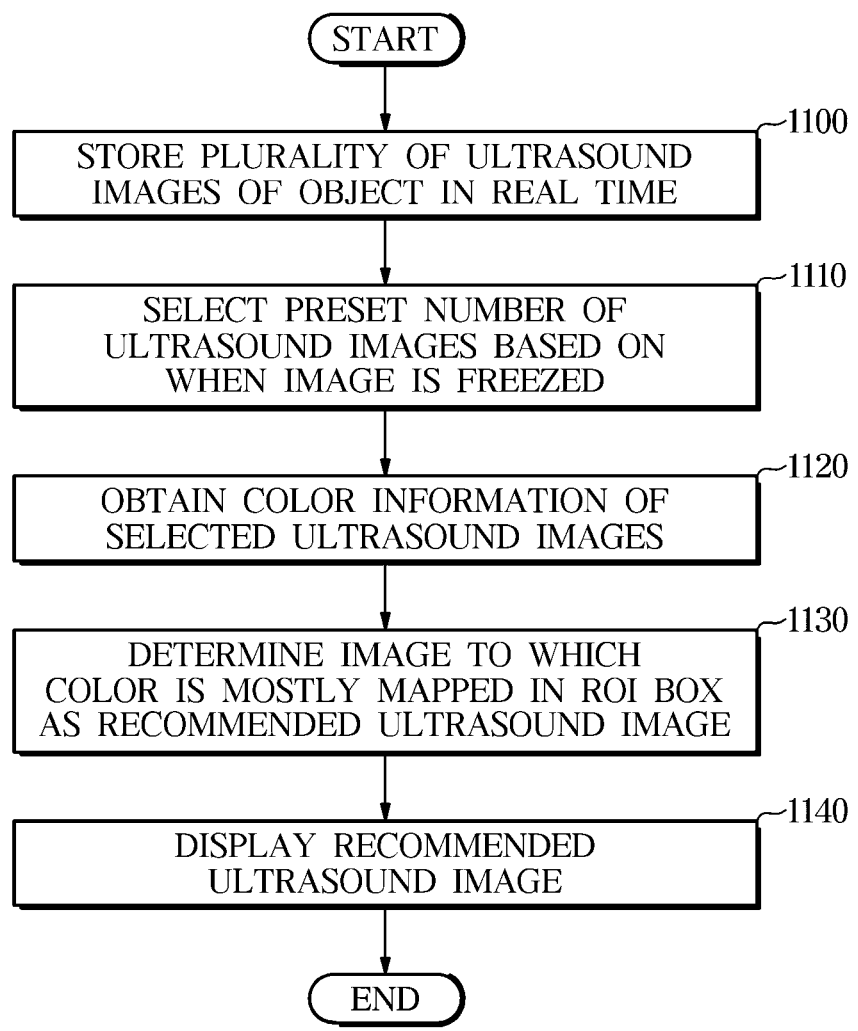
FIG. 11 is a control flow chart of a method of controlling an ultrasound diagnostic apparatus, according to an embodiment of the disclosure.

FIG. 11 is a control flow chart of a method of controlling an ultrasound diagnostic apparatus, according to an embodiment.

Referring to FIG. 11, the ultrasound diagnostic apparatus 10 in an embodiment may store a plurality of ultrasound images of the object ob in a storage in real time in 1100, and the plurality of ultrasound images may include a color doppler image.

The controller 185 may select a preset number of ultrasound images based on a time when a freeze input is received and the image freezes, in 1110. The controller 185 may then obtain color information of the selected ultrasound images in 1120, and the color information may include a color mapping value obtained by converting the color mapping extent into a numerical value.

The controller 185 may determine an image to which color is mostly mapped in a blood vessel included in a color doppler image as a recommended ultrasound image in 1130, and how to determine the recommended ultrasound image uses a color mapping algorithm or a deep learning model and the description thereof will be omitted.

The controller 185 may display the determined recommended ultrasound image on the display module 160 in 1140. In this case, when there are a plurality of recommended color doppler images with the same color mapping value, the controller 185 may display a recommended color doppler image closest to a time when the image freeze command is received on the display module 160.

In other words, the controller 185 may reflect the intention of the user by determining a color doppler image at a time closest to a time when the user inputs the freeze command as the recommended ultrasound image.

FIG. 12 is a control flow chart of a control method using an artificial neural network in a method of controlling an ultrasound diagnostic apparatus, according to an embodiment.

Referring to FIG. 12, the controller 185 may store a plurality of ultrasound images of the object ob in the storage in real time in 1200 as in FIG. 11, and the controller 185 may select a preset number of ultrasound images based on a time when the freeze input is received and the image freezes in 1210. The controller 185 may then obtain color information of the selected ultrasound images in 1220, and input a color doppler image frame including the obtained color information to a trained machine learning model in 1230.

In this case, the machine learning model may include a deep learning model, and as described above, may refer to an artificial neural network capable of determining how much color is mapped in the ultrasound image.

The controller 185 may determine a recommended ultrasound image based on an output value of the machine learning model in 1240, and the output value of the machine learning model may be an ultrasound image having a maximum mapping value or may include a number of the recommended ultrasound image frame.

As such, as the controller 185 may determine and display the recommended ultrasound image on the display module 160 in 1250, it may increase user convenience in relation to diagnosis because an extra operation of the input device 190 is not required when the user wants to display a color doppler image as a freeze image.

Meanwhile, the embodiments of the disclosure may be implemented in the form of a recording medium for storing instructions to be carried out by a computer. The instructions may be stored in the form of program codes, and when executed by the controller 185, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc. The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a recording medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a recording medium that may be readable to a device such as a server of the manufacturer, a server of the application store, or a relay server.

According to the disclosure, a desired still image may be obtained by automatically selecting a color doppler image frame to which color is properly mapped, when the user inputs a freeze command during ultrasound diagnosis, without an extra manipulation by the user.

The above description illustrates the disclosure. Embodiments of the disclosure are described above, and the disclosure may be used in other various combinations and alterations of the embodiments, and environments. The disclosure may be changed or modified within a range equivalent to what is described above and/or a range of technologies or knowledge of ordinary skill in the art. The aforementioned embodiments of the disclosure are for explaining the best modes to practice the technical idea of the disclosure, and many different modifications thereto may be made for a specific application area and usage. Accordingly, the embodiments of the disclosure are not intended to limit the scope of the disclosure to what are disclosed above. The appended claims are to be interpreted as including other embodiments.

What is claimed is:

1. An ultrasound diagnostic apparatus comprising:
a probe configured to transmit ultrasound signals to an object and receive ultrasound echo signals reflected from the object;
a display module;
an input device;
a storage; and
a controller configured to:
obtain color doppler signals based on processing of the echo signals,
obtain a plurality of color doppler image frames each having a color-mapped area based on the color doppler signals,
store the plurality of color doppler image frames in the storage, and control the display module to sequentially display the plurality of color doppler image frames,
wherein the controller is further configured to:
in response to receiving an image freeze command through the input device, determine a recommended color doppler image frame from the plurality of color doppler image frames based on a color mapping value corresponding to a size of the color-mapped area in each of the plurality of color doppler image frames,
control the display module to display the recommended color doppler image frame as a freeze image, determine the recommended color doppler image frame among a reference number of color doppler image frames obtained before or after receiving the image freeze command, and
determine one of the reference number of color doppler image frames which has a highest color mapping value as the recommended color doppler image frame.

2. The ultrasound diagnostic apparatus of claim 1, wherein the controller is configured to train a machine learning model trained with the plurality of color doppler image frames and the recommended color doppler image frame as input values.

3. The ultrasound diagnostic apparatus of claim 2, wherein the controller is configured to determine the recommended color doppler image frame based on an output value of the trained machine learning model.

4. The ultrasound diagnostic apparatus of claim 1, wherein the controller is configured to, based on the recommended color doppler image being in the plural, display a recommended color doppler image closest to a time when the image freeze command is received on the display module.

5. A method of controlling an ultrasound diagnostic apparatus including a probe for transmitting ultrasound signals to an object and receiving ultrasound echo signals reflected from the object, a display module, an input device, and a storage, the method comprising:
obtaining color doppler signals based on processing of the echo signals;
obtaining a plurality of color doppler image frames each having a color-mapped area based on the color doppler signals;
storing the plurality of color doppler image frames in the storage;
sequentially displaying the plurality of color doppler image frames on the display module;
in response to receiving an image freeze command through the input device, determining a recommended color doppler image frame from the plurality of color doppler image frames based on a color mapping value corresponding to a size of the color-mapped area in each of the plurality of color doppler image frames; and
controlling the display module to display the recommended color doppler image frame as a freeze image,
wherein the determining of the recommended color doppler image frame comprises:
determining the recommended color doppler image frame among a reference number of color doppler image frames obtained before or after receiving the image freeze command; and
determining one of the reference number of color doppler image frames which has a highest color mapping value as the recommended color doppler image frame.

6. The method of claim 5, further comprising:
obtaining a machine learning model trained with the plurality of color doppler image frames and the recommended color doppler image frame as input values.

7. The method of claim 6, wherein the determining of the recommended color doppler image frame comprises determining the recommended color doppler image frame based on an output value of the trained machine learning model.

8. The method of claim 5, further comprising:
based on the recommended color doppler image being in the plural, displaying a recommended color doppler image closest to a time when the image freeze command is received on the display module.

* * * * *